Figure 1:
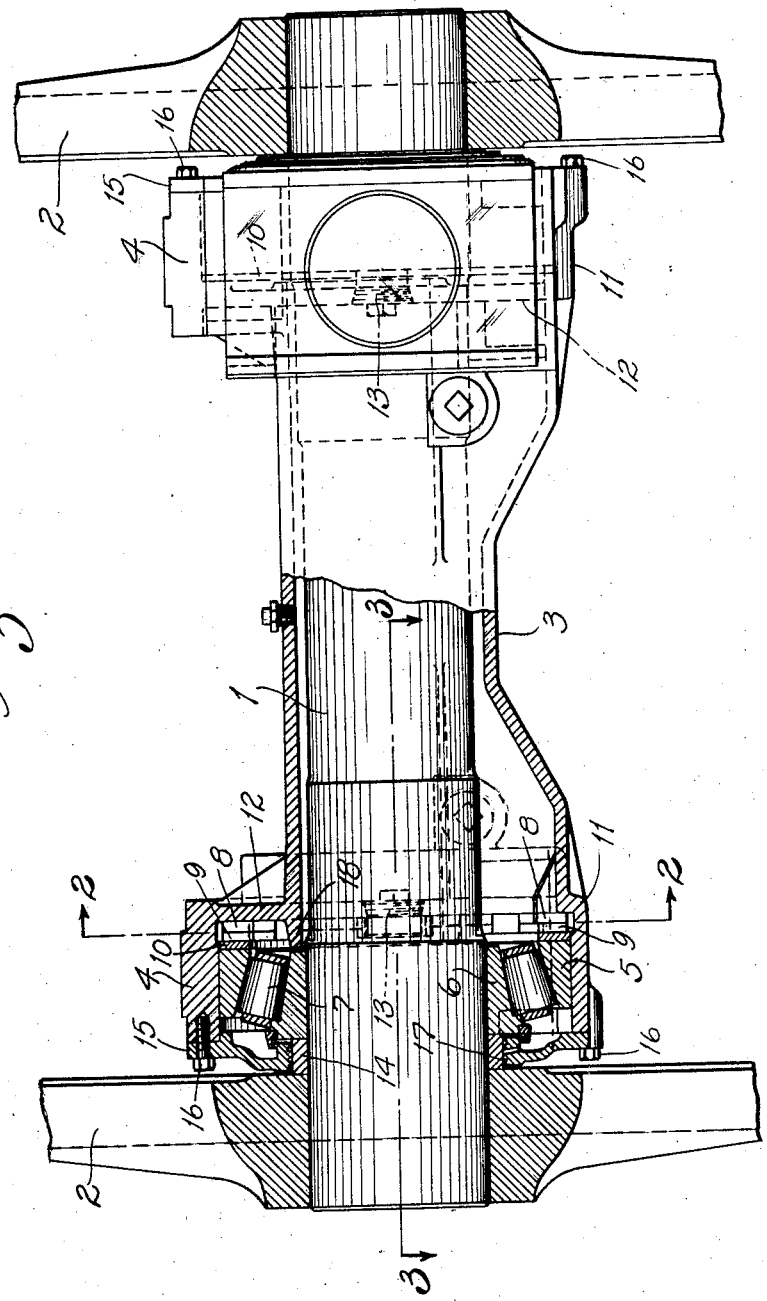

Oct. 22, 1929.      C. L. EASTBURG      1,732,263
AXLE BEARING
Filed Sept. 10, 1928      2 Sheets-Sheet 1

INVENTOR:
Clifford L. Eastburg.
by Carr & Carr & Gravely,
HIS ATTORNEYS.

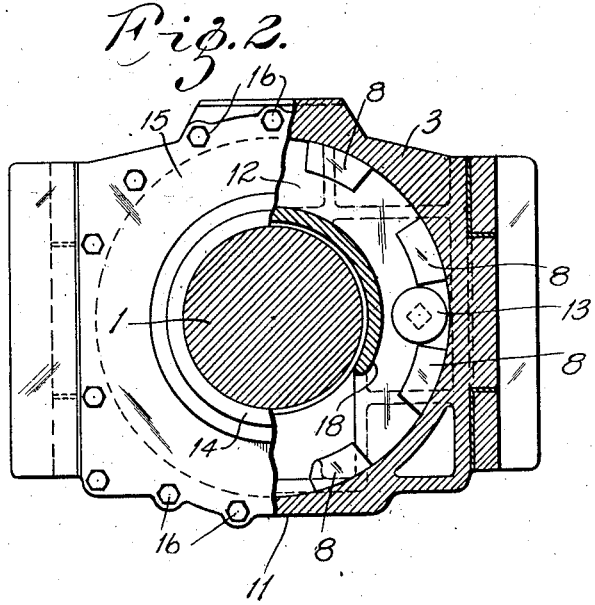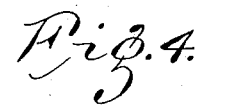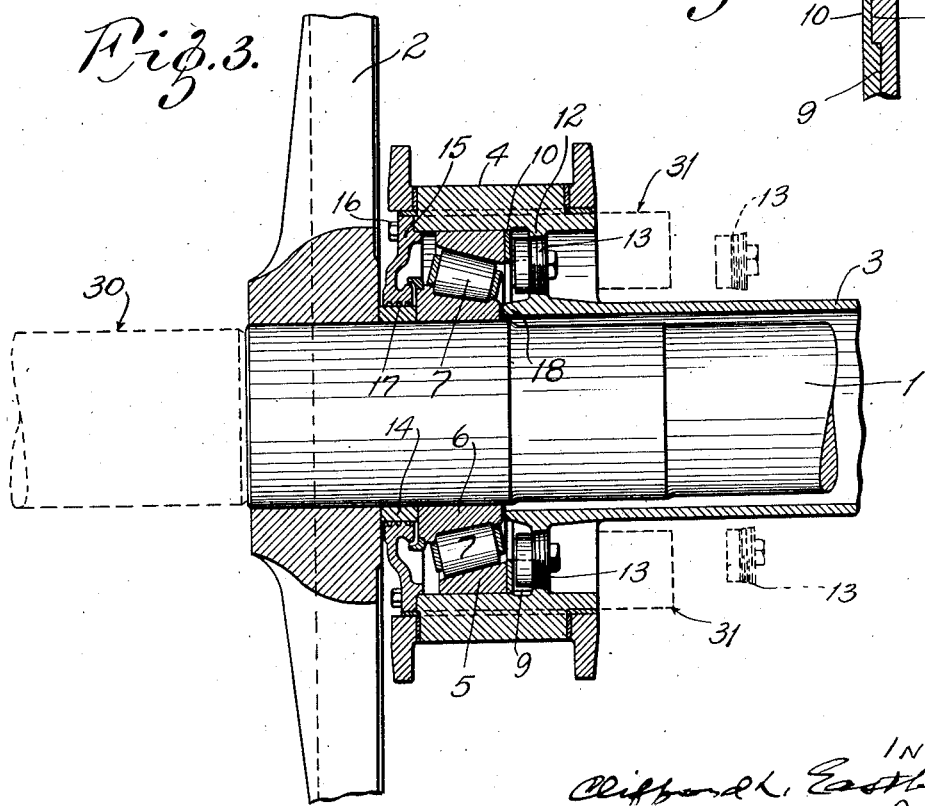

Patented Oct. 22, 1929

1,732,263

UNITED STATES PATENT OFFICE

CLIFFORD L. EASTBURG, OF CANTON, OHIO, ASSIGNOR TO THE TIMKEN ROLLER BEARING COMPANY, OF CANTON, OHIO, A CORPORATION OF OHIO

AXLE BEARING

Application filed September 10, 1928. Serial No. 304,993.

My invention relates to axle bearings especially to axle bearings for locomotive drive axles and other railway vehicle axle constructions. The invention has for its principal objects a construction which is strong and rigid and which is easily assembled and disassembled. The invention consists principally in providing an axle housing with an annular series of bosses in its interior adapted to cooperate with bosses on a ring in said housing, said ring constituting an abutment for the outer race member of an antifriction bearing. The invention further consists in a housing having an internal tubular projecting portion whose end is normally slightly spaced away from the end of the inner bearing member of said roller bearing. The invention further consists in the axle bearing and in the parts and combinations and arrangements of parts hereinafter described and claimed.

In the accompanying drawing wherein like reference numerals refer to like parts wherever they occur—

Fig. 1 is a part elevation, part vertical sectional view of a locomotive drive axle construction embodying my invention, Fig. 2 is a part sectional view on the line 2—2 of Fig. 1, Fig. 3 is a sectional view on the line 3—3 of Fig. 1, and Figs. 4 and 5 are detail views showing the bossed cup abutment ring and the cooperating bosses in the axle housing.

In the drawing is illustrated a locomotive drive axle 1 having drive wheels 2 on each end. A hollow axle housing 3 is provided for said axle and antifriction bearings are interposed between the enlarged tubular end portions 4 of said housing and the axle 1. The drawing illustrates a taper roller bearing at each end of the axle housing, each bearing comprising a cup 5 or outer bearing member mounted in the housing, a cone 6 mounted on the axle and conical rollers 7 between said cup and cone.

The housing 3 is provided with a circular series of projecting bosses 8 around its inner periphery that normally abut against bosses 9 on a ring 10 disposed in the tubular end portion 4 and abutting against the bearing cup 5. The lower portion of the housing has a flaring portion 11 extending from the middle of the housing to the end or bearing seat portion 4. Throughout the rest of the housing, the body portion of the housing is connected to the bearing seat portion by means of a radial web 12. In said web 12 are removable plugs 13 that project into the spaces between the bosses of said housing and the bosses of said abutment ring, thus preventing rotation of said ring relative to the housing.

Mounted between the inner bearing member 6 and the wheel 2 is a sleeve 14 that is engaged by the wheel 2, to hold the bearing cone 6 in position. Thus the bearing is firmly held in position. The end of the housing is closed by a ring 15 secured thereto by cap screws 16 and having a grooved inner peripheral portion 17 encircling said cone securing sleeve 14.

After the parts have been assembled and the abutment ring 10 locked in position by means of the plugs 13, the parts of the device are firmly held in position. The body portion of the housing has an internal projecting sleeve portion 18 that is normally spaced slightly away, say one-eighth inch, from the end of the bearing cone. In order to disassemble the device, the locking plugs 13 are removed from one end of the housing, and the housing is moved endwise away from the end from which said plugs have been removed. A tool is then inserted through the plug holes and the abutment ring 10 is loosened from its pinched position between the bearing cup 5 and the housing 3. The abutment ring 10 is then turned until its bosses register with the spaces between bosses of the housing so that the abutment ring can be moved out of contact with the bearing cup. The cap screws 16 are then removed and the whole structure placed in a wheel press with the ram 30 engaging the end of the axle and the backing bars 31 engaging the web portion or other suitable portion of the housing 3 to prevent movement of the housing. The ram is then actuated. Movement of the ram at first carries with it all parts of the bearing until the end of the bearing cone 6 is seated against the projecting inner tubular portion 18 of the housing. The cup is sufficiently loose in the housing to permit this movement and said movement is accommodated by the releasing of the cup abutment ring. After the bearing cone is seated against the tubular portion of the housing, further thrust is taken up on the housing and the bearings at one end are removed. In similar fashion the bearings at the other end may then be removed.

Figs. 4 and 5 are diagrammatic views, Fig. 4 showing the bosses engaging each other as in normal condition, and Fig. 5 showing bosses fitting into spaces, as in the disassembling operation.

The above described construction has numerous advantages. After the parts are assembled, they are firmly held in place during normal running condition and still they may be easily disassembled when required. Obviously numerous changes might be made without departing from the invention, and I do not wish to be limited to the precise construction shown.

What I claim is:

1. An axle bearing construction comprising an axle, a housing therefor having an enlarged tubular end portion, a roller bearing interposed between said axle and said tubular end portion, said tubular end portion having an annular series of bosses around its inner periphery and a ring in said tubular end portion against which the outer bearing member of said bearing abuts, said ring having bosses engaging the bosses of said axle housing.

2. An axle bearing construction comprising an axle, a housing therefor having an enlarged tubular end portion, a roller bearing interposed between said axle and said tubular end portion, said tubular end portion having an annular series of bosses around its inner periphery, a ring in said tubular end portion against which the outer bearing member of said bearing abuts, said ring having bosses engaging the bosses of said axle housing and removable means extending into spaces between said bosses to prevent rotation of said ring.

3. An axle bearing construction comprising an axle, a housing therefor having an enlarged tubular end portion, a roller bearing interposed between said axle and said tubular end portion, said tubular end portion having an annular series of bosses around its inner periphery and a ring in said tubular end portion against which the outer bearing member of said bearing abuts, said ring having bosses engaging the bosses of said axle housing and said housing having an internal projecting sleeve portion normally slightly spaced away from the end of the inner bearing member of said roller bearing and adapted to be engaged by said inner bearing member in the operation of disassembling the structure.

Signed at Canton, Ohio, this 5th day of Sept., 1928.

CLIFFORD L. EASTBURG.